(12) United States Patent
Lamb et al.

(10) Patent No.: US 7,245,900 B1
(45) Date of Patent: Jul. 17, 2007

(54) METHOD AND SYSTEM FOR USING BASIC SERVICE SET IDENTIFIERS (BSSIDS) FOR EMERGENCY SERVICES ROUTING

(75) Inventors: Robert C. Lamb, Blue Springs, MO (US); Daniel Durig, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 9 days.

(21) Appl. No.: 11/210,610

(22) Filed: Aug. 24, 2005

(51) Int. Cl.
*H04Q 7/20* (2006.01)
*H04Q 7/38* (2006.01)

(52) U.S. Cl. .............. 455/404.1; 455/404.2; 455/403; 455/500; 455/521; 455/466; 455/422.1; 455/456.1; 379/45; 379/37

(58) Field of Classification Search ............ 455/404.1, 455/404.2, 403, 422.1, 456.1–457, 500, 517, 455/521, 412.1, 412.2, 414.1, 414.3, 414.4, 455/466, 426.1, 426.2, 445, 550.1; 379/45, 379/37; 370/352
See application file for complete search history.

(56) References Cited

U.S. PATENT DOCUMENTS

| | | | |
|---|---|---|---|
| 6,427,001 B1 | 7/2002 | Contractor et al. | |
| 6,665,611 B1 | 12/2003 | Oran et al. | |
| 6,678,357 B2 | 1/2004 | Stumer et al. | |
| 6,744,859 B1 | 6/2004 | Koepke et al. | |
| 6,771,742 B2 | 8/2004 | McCalmont et al. | |
| 2003/0109245 A1 | 6/2003 | McCalmont et al. | |
| 2004/0057425 A1 | 3/2004 | Brouwer et al. | |
| 2004/0184584 A1 | 9/2004 | McCalmont et al. | |
| 2004/0190497 A1 | 9/2004 | Knox | |
| 2004/0192271 A1 | 9/2004 | Eisner et al. | |
| 2005/0020241 A1 | 1/2005 | Holland et al. | |
| 2005/0020242 A1 | 1/2005 | Holland et al. | |
| 2005/0020280 A1 | 1/2005 | Holland et al. | |
| 2005/0020281 A1 | 1/2005 | Holland et al. | |
| 2005/0026589 A1 | 2/2005 | Holland et al. | |
| 2005/0083911 A1 | 4/2005 | Grabelsky et al. | |
| 2005/0111630 A1 | 5/2005 | Potorny et al. | |
| 2006/0030290 A1* | 2/2006 | Rudolf et al. ............ | 455/404.1 |
| 2006/0072547 A1* | 4/2006 | Florkey et al. ............. | 370/352 |
| 2006/0120517 A1* | 6/2006 | Moon et al. ................. | 379/45 |
| 2006/0188073 A1* | 8/2006 | Wright ........................ | 379/45 |

OTHER PUBLICATIONS

Schulzrinne, Internet Draft, "Emergency Call Services for SIP-based Internet Telephony," Mar. 25, 2001.

(Continued)

*Primary Examiner*—Keith Ferguson (57) ABSTRACT

A plurality of public safety answering points (PSAPs) are accessible via a voice-over-packet (VoP) network. Each wireless access point of the VoP network is identified by a basic service set identifier (BSSID). A mobile node associates with a wireless access point and stores the wireless access point's BSSID as an indicator of the mobile node's location. A user of the mobile node dials digits for an emergency services call. In response, the mobile node transmits a SIP INVITE message that includes the BSSID and an additional indicator of the mobile node's location, e.g., determined using GPS or tower triangulation. A SIP proxy server receives the SIP INVITE message and attempts to determine the appropriate PSAP to answer the call based on the BSSID. If the attempt is unsuccessful, the SIP proxy server determines the appropriate PSAP based on the additional indicator.

18 Claims, 3 Drawing Sheets

OTHER PUBLICATIONS

H. Schulzrinne, Internet Draft, "Emergency Services URI for the Session Initiation Protocol," Feb. 8, 2004.

H. Schulzrinne, Internet Draft, "Emergency Services for Internet Telephony Systems," Oct. 18, 2004.

Avaya, Inc., "Comments on IP Telephony Support for Emergency Calling Service," TR 41.4.1/01-08-002, Jul. 25, 2001.

Intrado, Inc., "VoIP Emergency Calling Services," 2003.

Cisco Systems, Inc., "Cisco Emergency Responder Version 1.2 (2)", Data Sheet, Sep. 2004.

Donny Jackson, "Nortel proposes VoIP 911 solution," *Mobile Radio Technology*, May 1, 2004.

Eric Griffith, "Wi-Fi Powers Metro Positioning System," Wi-Fi Planet News, Jun. 20, 2005.

H. Schulzrinne, Internet Draft, "Requirements for Emergency Context Resolution with Internet Technologies," May 5, 2005.

* cited by examiner

METHOD AND SYSTEM FOR USING BASIC SERVICE SET IDENTIFIERS (BSSIDS) FOR EMERGENCY SERVICES ROUTING

BACKGROUND

1. Field of the Invention

The present invention relates to telecommunications and, more particularly, to methods and systems for routing an emergency services call that originates through a wireless access point of a voice-over-packet (VoP) network to an appropriate public safety answering point (PSAP) based on the basic service set identifier (BSSID) of the wireless access point.

2. Description of Related Art

The ability to place an emergency services call by dialing 9-1-1 has become widespread throughout the United States. When a 9-1-1 call is placed, it is typically answered at a public safety answering point (PSAP). However, there are many PSAPs throughout the United States, each serving a particular area, such as a city, county, or metropolitan area. The public switched telephone network (PSTN) can route a 9-1-1 call to the appropriate PSAP, i.e., the PSAP that servers the caller's area, because the caller's telephone number is associated with a fixed location.

Increasingly, however, packet networks are being used for voice communications, including emergency services calls. Such voice-over-packet (VoP) networks often route calls that are placed by client devices that can change their point of connectivity to the VoP network. For example, a mobile node may be able to place calls over the VoP network from different access points at different locations. In many cases, the access points are wireless access points that wirelessly communicate with mobile nodes using an IEEE 802.11x or other wireless local area network (WLAN) protocol. Because of this mobility, mobile nodes and their associated telephone numbers may not be reliably associated with fixed geographic locations. Even so, it is desirable for a mobile node user to be able to dial 9-1-1 from any location and have the call routed through the VoP network to the appropriate PSAP, i.e., the PSAP that serves the user's current location.

Accordingly, there is a need for providing methods and systems for routing VoP emergency services calls to appropriate PSAPs.

SUMMARY

In a first principal aspect, an exemplary embodiment of the present invention provides a method for emergency service call routing in a network that includes a voice-over-packet (VoP) network and a plurality of public safety answering points (PSAPs). In accordance with the method, a mobile node obtains a first indicator of its location by a first method and obtains a second indicator of its location by a second method. The first and second methods are distinct. A wireless access point of the VoP network receives from the mobile node at least one message relating to an emergency services call originating from the mobile node. The at least one message includes the first and second indicators. The call is routed to a particular PSAP, from among the plurality of PSAPs, based on at least one of the first and second indicators.

In a second principal aspect, an exemplary embodiment of the present invention provides a method for emergency services call origination. In accordance with the method, a mobile node associates with a wireless access point of a voice-over-packet (VoP) network. The mobile node stores a basic service set identifier (BSSID) of the wireless access point. The mobile node receives a request from a user to originate an emergency services call. In response to the request, the mobile node determines a mobile node position using a wireless positioning technology and wirelessly transmits a Session Initiation Protocol (SIP) INVITE message to the wireless access point. The SIP INVITE message includes the BSSID and the mobile node position.

In a third principal aspect, an exemplary embodiment of the present invention provides a system for emergency services call routing in a network that includes a voice-over-packet (VoP) network and a plurality of public safety answering points (PSAPs). The system comprises a plurality of wireless access points communicatively coupled to the VoP network, an access point database, an automatic location information (ALI) database, and a proxy server communicatively coupled to the VoP network, access point database, and ALI database. Each of the wireless access points is associated with a respective basic service set identifier (BSSID). The access point database stores BSSIDs and locations of the wireless access points. The ALI database stores information regarding areas served by each of the PSAPs. The proxy server consults the access point database and the ALI database to selectively route an emergency services call from one of the wireless access points to an appropriate one of the PSAPs.

DETAILED DESCRIPTION OF EXEMPLARY EMBODIMENTS

Overview

The present invention, in its exemplary embodiments, provides methods and systems for routing an emergency services call, such as a 9-1-1 call, in a voice-over-packet (VoP) network to a public safety answering point (PSAP) that is appropriate for answering the call. The emergency services call may originate from a mobile node that has associated with a particular wireless access point of the VoP network. The mobile node could be a wireless telephone, a wirelessly-equipped laptop computer or personal digital assistant (PDA), or other wireless communication device. The mobile node may communicate with the wireless access point over an air interface using an IEEE 802.11x, IEEE 802.16, HiperLAN, HomeRF, Bluetooth, or other wireless communications protocol. The mobile node may also be able to communicate with a wireless wide area network (WWAN), for example, using CDMA, TDMA, or GSM.

Particular PSAPs may be appropriate for answering calls originating from particular wireless access points. Which PSAP is appropriate for a particular wireless access point may depend on the location of the wireless access point, for example the jurisdiction (e.g., city, town, or county) in which the access point is located and/or on the type of location (e.g., in an airport). Thus, emergency services calls originating from a wireless access point located in a particular location should be routed to a PSAP that serves that particular location, rather than to a PSAP that serves some other location.

To facilitate the routing of an emergency services call to the appropriate PSAP when a mobile node is communicating via a wireless access point, the mobile node may obtain one or more indicators of its location. The mobile node may obtain one or more of these indicators in advance of a user's instruction to originate an emergency services call, in response to such instruction, or in response to a request from the network. In an exemplary embodiment, the mobile node obtains a first indicator of its location by a first method and a second indicator of its location by a second method, wherein the first and second methods are distinct.

The first indicator could be, for example, an identifier of the wireless access point with which the mobile node is associated. The identifier could be, for example, the basic service set identifier (BSSID) of the wireless access point. A BSSID is a 48-bit identifier that uniquely identifies a wireless access point. A BSSID for a wireless access point may be the same as or related to the wireless medium access control (MAC) address of the wireless access point. The mobile node may obtain the BSSID of a wireless access point when the mobile node associates with the wireless access point. The mobile node may then store the BSSID for later use.

The mobile node may obtain a second indicator of its location by using a wireless positioning technology. For example, the mobile node may determine its latitude/longitude position using a satellite-based positioning system, such as the Global Positioning System (GPS). Alternatively, the mobile node may determine its position using a tower triangulation approach, i.e., identifying antenna towers or sectors in the WWAN from which the mobile node received signals. For example, while in communication with the WWAN, the mobile node may store identifications of the sectors that provide the strongest pilot signals and their signal strengths, as measured by the mobile node. These sector identifications could collectively serve as a second indicator of the mobile node's location. Thus, the mobile node may save the most recent sector identifications for use as an indicator of the mobile node's location, even when the mobile node is no longer in communication with the WWAN.

The mobile node could obtain a second indicator of its location in response to a request from the user to originate an emergency services call, in advance of such request from the user, or in response to a request from the network after originating an emergency services call. For example, when a user of the mobile node requests an emergency services call, e.g., by dialing 9-1-1, the mobile node may responsively determine its latitude/longitude position using GPS and then transmit a message to originate the emergency services call. The message may include the BSSID and the latitude/longitude position. In an exemplary embodiment, the mobile node uses the Session Initiation Protocol (SIP) for call signaling. Thus, to originate an emergency services call, the mobile node may transmit a SIP INVITE message that includes an emergency services URI in a destination field. The SIP INVITE message may also include the first location indicator (e.g., BSSID) and the second location indicator (e.g., GPS-determined position) in predetermined fields. The SIP INVITE message may also include a callback number, such as the mobile node's mobile directory number (MDN).

A SIP proxy server may receive the SIP INVITE message and may use one or more of the location indicators contained in the message to route the SIP INVITE message so that the emergency services call will be answered by the appropriate PSAP. In an exemplary embodiment, the SIP proxy server attempts to determine the appropriate PSAP based on the first indicator contained in the SIP INVITE message. If this attempt is unsuccessful, the SIP proxy server may determine the appropriate PSAP based on the second indicator contained in the SIP INVITE message. In this way, the second indicator of the mobile node's location may be used as a backup.

For example, if the SIP INVITE message contains a BSSID as the first indicator, the SIP proxy server may consult an access point database. The access point database stores the locations of wireless access points such that the locations are keyed to the BSSIDs of the wireless access points. The information in the access point database regarding a wireless access point may have been provided by a user of the wireless access point, e.g., as part of a process for activating the wireless access point. For example, a wireless access point may require a signal from a service provider in order to be activated, and the service provider may require the user to provide the BSSID of the wireless access point and its location, e.g., in terms of a street address, in order for the service provider to send the activation signal. The user may also be able to update the information at subsequent times, such as when the user moves the wireless access point to a new location.

Thus, when the SIP proxy server receives a SIP INVITE message that contains a BSSID, the SIP proxy server may look up the BSSID in the access point database to determine the location of the wireless access point that corresponds to that BSSID. The location may be expressed, for example, in terms of a street address and/or zip code, in terms of a section, floor, or room of a building, and/or in terms of latitude and longitude. The SIP proxy server may then determine which PSAP serves the location of the wireless access point. To determine the appropriate PSAP for the given location, the SIP proxy server may consult an automatic location information (ALI) database. The ALI database may identify a plurality of available PSAPs and may store information regarding the locations served by each of the PSAPs. The ALI database may also include routing addresses that the SIP proxy server can use to route emergency services call to the PSAPs. In this way, the SIP proxy server route the emergency services call to the appropriate PSAP based on the first locator, e.g., based on BSSID.

In some cases, however, the access point database may not contain location information for a given BSSID. This may occur for various reasons. Some users may simply not provide the information. For example, the user may have acquired the wireless access point under a plan that did not require the user to provide location information as part of the activation process. Alternatively, the user may have provided incorrect information, e.g., an incorrect BSSID. In still other cases, the BSSID that the mobile node sees may be different than the BSSID of the wireless access point that the user registered, e.g., because the mobile node is communicating through a wireless repeater.

In cases where the access point database does not contain location information for the BSSID contained in the SIP INVITE message, the SIP proxy server may use the second indicator contained in the SIP INVITE message to determine the appropriate PSAP. For example, if the second indicator is a GPS-determined latitude/longitude position of the mobile node, the SIP proxy server may determine which PSAP has a service area encompassing that latitude/longitude position. In addition, the SIP proxy server could compare the locations indicated by the first and second location indicators to determine whether they are consistent. If the two locations are consistent, the SIP proxy server could rely on a street address that the access point database has for the BSSID. If the two locations are not consistent, however, this may indicate that the information in the access point database is not current. For example, the user may have moved the wireless access point without updating the location stored in the access point database. In such cases, the SIP proxy server may instead rely on the GPS-determined latitude/longitude position.

Instead of transmitting both location indicators in the SIP INVITE message, the mobile node might transmit only the first indicator. If the first indicator is insufficient to determine the appropriate PSAP, then the SIP proxy server may try to obtain the second indicator from the mobile node. For example, the SIP proxy server may request a second location indicator after determining that the access point database does not have a location for the BSSID provided by the mobile node. To obtain a second location indicator, the SIP proxy server could send a signal to the mobile node instructing the mobile node to determine its position and to send the mobile node position to the SIP proxy server. In response, the mobile node may obtain its latitude/longitude position using GPS and transmit the latitude/longitude position to the SIP proxy server in a subsequent message.

Alternatively, the mobile node may rely on tower triangulation. For example, the mobile node could report back to the SIP proxy server identifications of the three sectors in the WWAN that had the strongest pilot signals, as most recently measured by the mobile node. In another approach, instead of relying on triangulation, each sector in the WWAN could be associated with a particular PSAP. Thus, the mobile node could report only a single sector, e.g., the sector that had the strongest pilot signal as most recently measured by the mobile node. The SIP proxy server could then determine which PSAP is appropriate for the call from this single sector.

In this way, a mobile node user may dial a digit string, such as "911," to originate an emergency services call without specifying which particular PSAP should answer the call, and the call can be routed through the VoP network to the PSAP that serves the area in which the user is currently located, whether the user is currently at a home location or is roaming.

Exemplary Network Architecture

Figure 1:
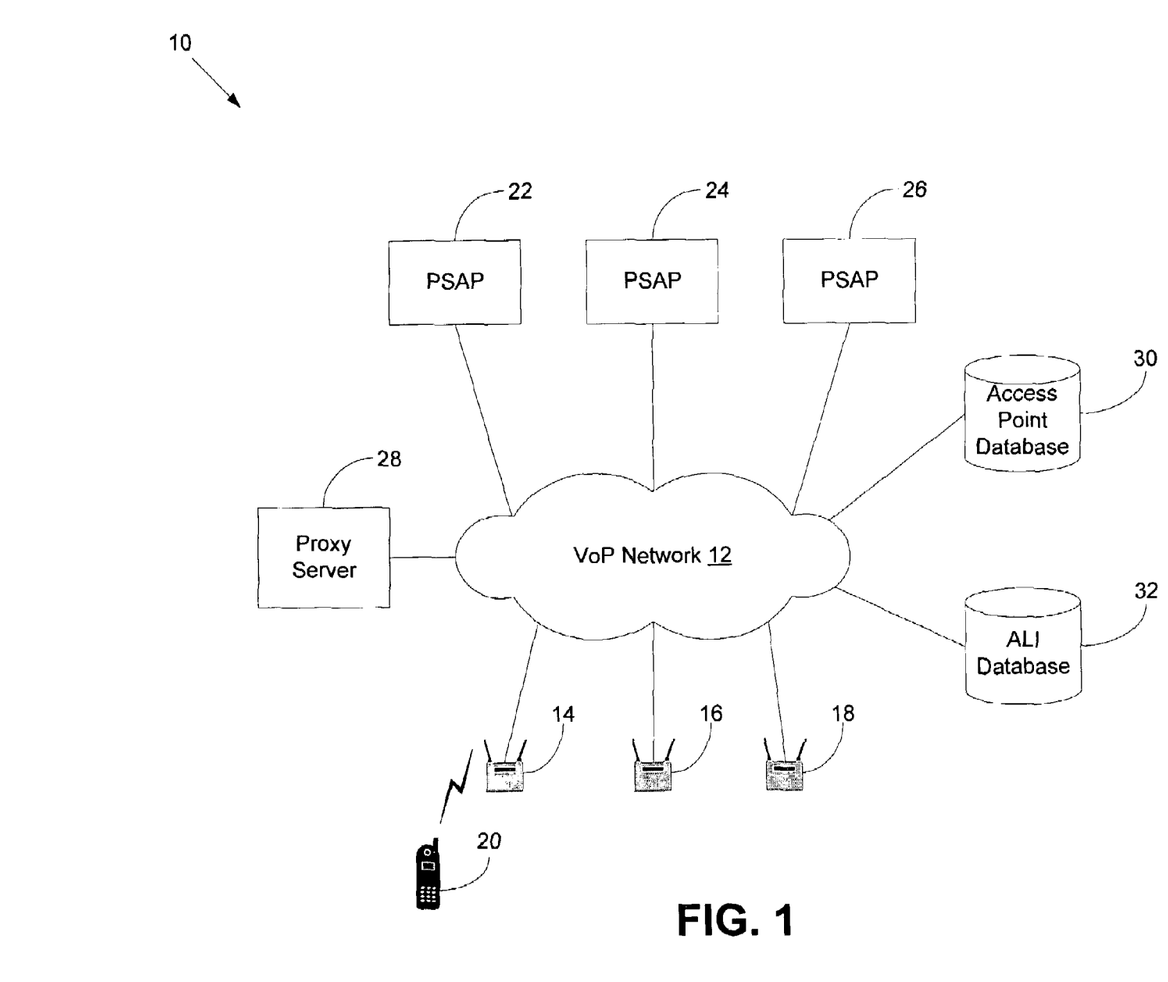
FIG. 1 is a simplified block diagram of a telecommunications network, in accordance with an exemplary embodiment of the present invention.

Referring to the drawings, FIG. 1 is a simplified block diagram of an exemplary telecommunications network 10. Network 10 includes a voice-over-packet (VoP) network 12, which is a packet-switched network that conveys voice or other media in a packetized format. VoP network 12 may include one or more local area networks (LANs), which could be, for example, wireless local area networks (WLANs). VoP network 12 may also one or more wide area networks (WANs), which may include public networks, such as the Internet, and/or private networks.

In an exemplary embodiment, VoP network 12 routes packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. Application layer protocols, such as the Session Initiation Protocol (SIP), may be used to set up and control voice calls and other communication sessions through VoP network 12. Relevant aspects of SIP are described in Rosenberg, et al., "SIP: Session Initiation Protocol," Request for Comments 3261 (June 2002), which is incorporated herein by reference. VoP network 12 may carry the voice or other media in such calls, as UDP/IP or TCP/IP packets, in a real-time packet media format, e.g., by using the real-time transport protocol (RTP). Relevant aspects of RTP are described in Schulzrinne, et al., "RTP: A Transport Protocol for Real-Time Applications," Request for Comments 1889 (January 1996), which is incorporated herein by reference.

One or more wireless access points may be communicatively coupled to VoP network 12 to allow mobile nodes to access VoP network 12, e.g., to make voice calls, check e-mail, engage in Web browsing, or for other purposes. For example, FIG. 1 shows VoP network 12 coupled to wireless access points 14, 16, and 18 and shows a mobile node 20 in communication with wireless access point 14 via an air interface. Although FIG. 1 shows three wireless access points, it is to be understood that a greater or fewer number of wireless access points could be coupled to VoP network 12. Mobile node 20 could be a wireless telephone, wirelessly-equipped laptop computer, wireless PDA, or other wireless communication device. Mobile node 20 may communicate with wireless access points, such as wireless access point 14, via a wireless interface, e.g., in accordance with IEEE 802.11x, IEEE 802.16, HiperLAN, HomeRF, or Bluetooth specifications.

Wireless access points 14, 16, and 18 each provide a wireless coverage area within which the wireless access point can wirelessly communicate with wireless communication devices, such as mobile node 20. In an exemplary embodiment, wireless access points 14, 16, and 18 are in different locations. Such locations may include business locations, residential locations, and public areas, such as airports. As a mobile node moves from one location to another, it may communicate with different wireless access points. For example, FIG. 1 shows mobile node 20 in wireless communication with wireless access point 14. However, mobile mode 20 may subsequently move out of the coverage area of wireless access point 14 and into the coverage area of wireless access point 16, so that mobile node 20 may communicate with wireless access point 16 instead of wireless access point 14.

VoP network 12 may be communicatively coupled to a plurality of public safety answering points (PSAPs). For example, FIG. 1 shows PSAPs 22, 24, and 26 communicatively coupled to VoP network 12. Although FIG. 1 shows three PSAPs for purposes of illustration, it is to be understood that VoP network 12 could be coupled to a greater or fewer number of PSAPs. In addition, although FIG. 1 shows PSAPs 22, 24, and 26 directly connected to VoP network 12, it is to be understood that one or more of these PSAPs could be indirectly connected to VoP network 12. For example, a PSAP may be connected to one or more circuit-switched elements, such as in the public switched telephone network (PSTN), which, in turn, may be communicatively coupled to VoP network 12 via a media gateway that converts between packet-switched and circuit-switched media formats.

PSAPs 22, 24, and 26 may each include an answering center that answers emergency services calls, such as 9-1-1 calls, on behalf of a public safety organization. Such public safety organizations may include, for example, law enforcement, fire protection, and/or medical assistance organizations. However, a public safety organization may provide services in only a particular geographic area (e.g., a particular city, town, county, or metropolitan area) or in only a particular type of location (e.g., in a particular airport). Accordingly, it is beneficial for an emergency services call to be answered at a PSAP that servers the caller's location.

For example, PSAP 22 may serve the area in which wireless access point 14 is located, PSAP 24 may serve the area in which wireless access point 16 is located, PSAP 26 and may serve the area in which wireless access point 18 is located. This means that emergency services calls originating from wireless access point 14 should be routed to PSAP 22, rather than to PSAP 24 or PSAP 26. Similarly, emergency services calls originating from wireless access point 16 should be routed to PSAP 24, and emergency services calls originating from wireless access point 18 should be routed to PSAP 26.

Wireless access points 14, 16, and 18 may each be associated with one or more identifiers, such as basic service set identifiers (BSSIDs). These identifiers may be used to facilitate the routing of emergency services calls to the appropriate PSAP, as described in more detail below. Wireless access points 14, 16, and 18 may each store its respective one or more identifiers in its own local data store. Alternatively, the one or more identifiers for each of wireless access points 14, 16, and 18 may be stored in a separate data store, e.g., in a central database that wireless access points 14, 16, and 18 can access as needed.

One or more network elements may function to route calls, such as emergency services calls, through VoP network 12. In an exemplary embodiment, a proxy server 28 performs this routing function. Thus, when a mobile node, such as mobile node 20, originates a call, e.g., via wireless access point 14, proxy server 28 may engage in signaling, e.g., using SIP, to set up the call. In particular, if the call is an emergency services call, proxy server 28 may engage in signaling so that the call is routed to the appropriate PSAP, i.e., the PSAP that serves the area in which the originating wireless access point is located.

Proxy server 28 may be able to access one or more databases that store information that can facilitate the routing of emergency services calls to the appropriate PSAP. For example, VoP network 12 may be communicatively coupled to an access point database 30. Access point database 30 stores information regarding wireless access points communicatively coupled to VoP network 12, e.g., wireless access points 14, 16, and 18. In particular, access point database 30 stores identifiers, such as BSSIDs, and locations of wireless access points, such that the BSSIDs map to the locations. In this way, a wireless access point's BSSID can be used to look up the wireless access point's location in access point database 30. Access point database 30 may store locations expressed in any of various ways, e.g., in terms of street addresses, zip codes, floors or sections of buildings, and/or latitude and longitude.

VoP network 12 may also be communicatively coupled to an automatic location information (ALI) database 32. ALI database 32 may store information regarding the PSAPs accessible via VoP network 12, e.g., PSAPs 22, 24, and 26. In particular, ALI database 32 may store information regarding the locations served by each of the PSAPs. ALI database 32 may also store routing addresses that proxy server 28 can use to route emergency services calls to the PSAPs. The routing addresses could be SIP addresses, e.g., in the case that SIP is used to set up calls through VoP network 12. However, other types of routing addresses could be used, e.g., if other protocols are used to route calls through VoP network 12.

Although FIG. 1 shows databases 30 and 32 as network elements separate from proxy server 28, it is to be understood that either of these databases could be integrated into proxy server 28. In addition, although FIG. 1 shows databases 30 and 32 as being separate from each other, it is to be understood that they could be part of the same database.

Exemplary Operation

Figure 2:
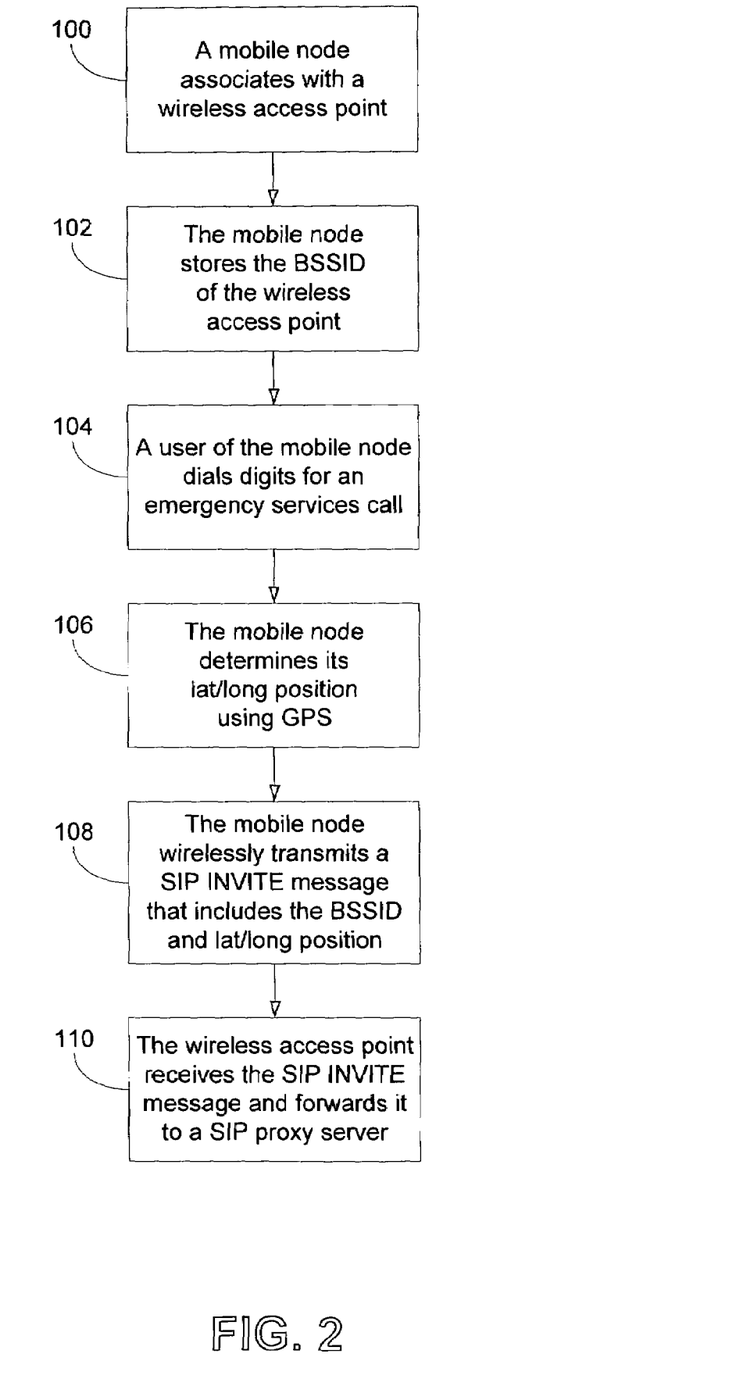
FIG. 2 is a flow chart illustrating a first part of a method for routing a voice-over-packet emergency services call to an appropriate PSAP, in accordance with an exemplary embodiment of the present invention.
Figure 3:
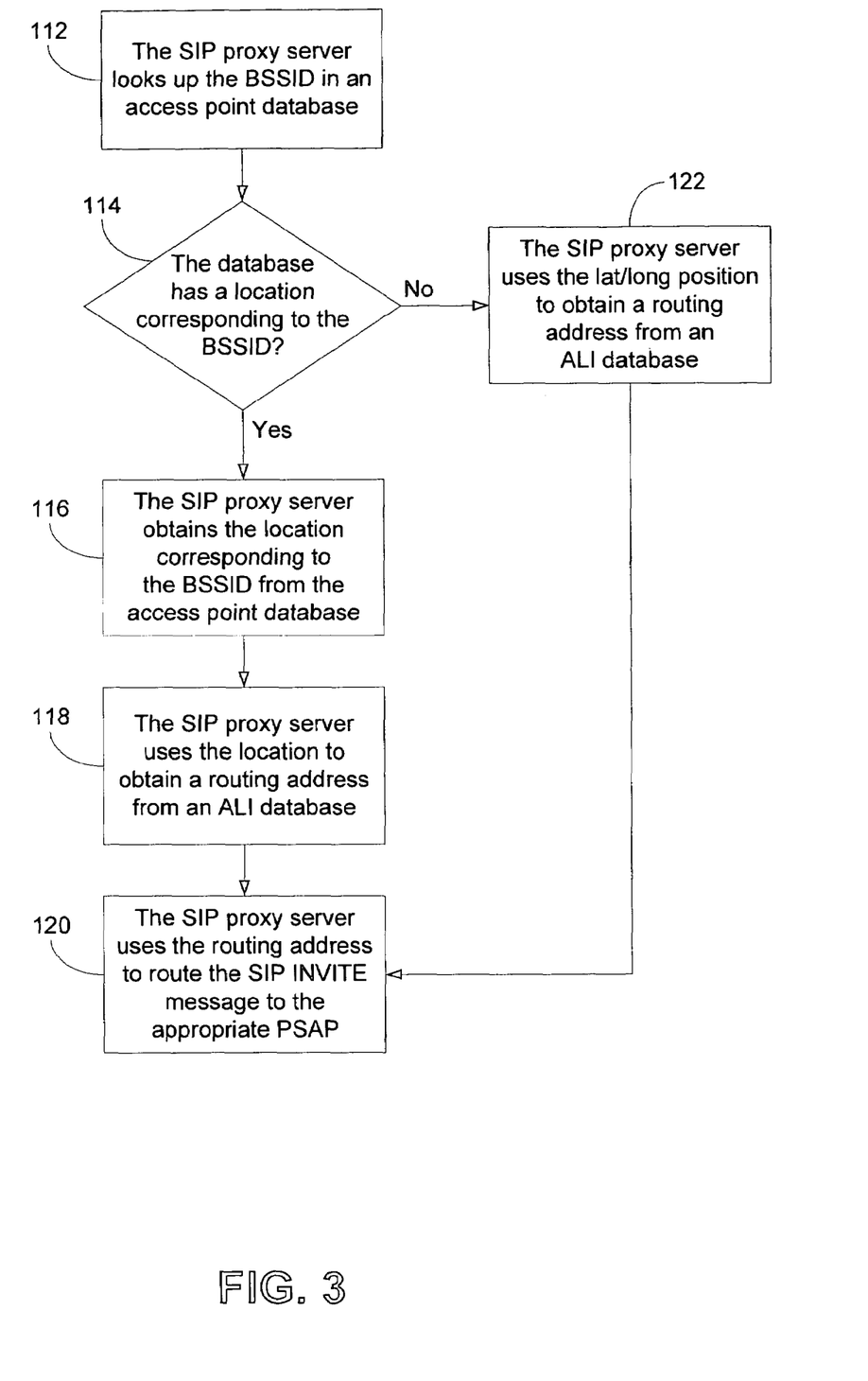
FIG. 3 is a flow chart illustrating a second part of a method for routing a voice-over-packet emergency services call to an appropriate PSAP, in accordance with an exemplary embodiment of the present invention.

FIGS. 2 and 3 are flow charts illustrating steps of an exemplary method of operation. In this exemplary method, SIP is the signaling protocol used to set up calls in the VoP network. However, it is to be understood that SIP is exemplary only; other signaling protocols could be used. In addition, FIGS. 2 and 3 assume the network architecture shown in FIG. 1, though it is to be understood that other network architectures could be used.

The process may begin when a mobile node associates with a wireless access point, as indicated by block 100. As part of the association process, the mobile node obtains the BSSID of the wireless access point. The mobile node stores this BSSID for later use, as indicated by block 102.

At some point, a user of the mobile node dials digits for an emergency services call, as indicated by block 104. The particular digits that the user dials may depend on the jurisdiction in which the user is located. For example, in many parts of the United States, an emergency services call can be placed by dialing "911." In other areas, particularly outside of the United States, other digits may be used to place emergency services calls. Significantly, the dialed digits may indicate an emergency services call without specifying which particular PSAP should answer the call. For example, there are many PSAPs in the United States that answer 9-1-1 calls. Thus, FIGS. 2 and 3 illustrate an exemplary method for selectively routing an emergency services call to a particular PSAP, i.e., the PSAP that serves the area in which the caller is located, from among the various PSAPs that are also accessible via the VoP network.

In response to the dialed digits, the mobile node determines is position using GPS, as indicated by block 106. The position obtained in this way may be a "lat/long position," i.e., a position that is expressed in terms of latitude and longitude. Alternatively, the mobile node might determine its position in other ways, e.g., using tower triangulation.

The mobile node then wirelessly transmits a SIP INVITE message, as indicated by block 108. The SIP INVITE message may include an emergency services URI in a destination field. The emergency services URI may include the digits that the user dialed, e.g., "911." Alternatively, the emergency services URI may include a designation other than the dialed digits to indicate that an emergency services call is being requested. For example, the emergency services URI may include an "sos" designation that could be used to indicate an emergency services call independently of the particular digits the user dialed. As noted above, such emergency services URIs indicate that an emergency services call is requested without specifying which particular PSAP should answer the call.

The SIP INVITE message also includes the BSSID of the wireless access point, i.e., the BSSID that the mobile node stored after associating with the wireless access point. The SIP INVITE message may also include the position that mobile node determined, e.g., a lat/long position determined using GPS. The SIP INVITE message may also include other information related to the emergency services call. For example, the SIP INVITE message may include a call-back number such as the mobile node's MDN.

The wireless access point receives the SIP INVITE message and forwards it to a SIP proxy server, as indicated by block 110. The SIP proxy server recognizes, e.g., from the emergency services URI, that an emergency services call is being requested. In response, the SIP proxy server determines how to route the SIP INVITE message so that the appropriate PSAP receives the emergency services call. FIG. 3 illustrates the steps the SIP proxy server may perform to make this determination.

First, the SIP proxy server looks up the BSSID in an access point database, as indicated by block 112. How the process continues depends on whether the access point database has a location that corresponds to the BSSID, as indicated by block 114. In particular, the access point database might not have a listing for the BSSID, or the access point database might list the BSSID but without a valid wireless access point location corresponding to the BSSID.

If the access point database has a valid location corresponding to the BSSID, then the SIP proxy server obtains the location corresponding to the BSSID from the access point database, as indicated by block 116. The SIP proxy server then uses this location to obtain a routing address from a ALI database, as indicated by block 118. The SIP proxy server then uses the routing the address to route the SIP INVITE message to the appropriate PSAP, i.e., the PSAP that serves the location obtained from the access point database, as indicated by block 120.

If, however, the access point database does not have a valid location for the BSSID, then the SIP proxy server instead uses the position that the mobile node determined, e.g., GPS-determined lat/long position. In particular, the SIP proxy server uses the lat/long position to obtain a routing address from an ALI database, as indicated by block 122. The SIP proxy server then uses the routing address to route the SIP INVITE message to the appropriate PSAP, i.e., the PSAP that serves the area in which the lat/long position is located.

In some cases, the SIP proxy server may be unable to determine the appropriate PSAP from the information contained in the SIP INVITE message. This may occur, for example, when the SIP proxy server receives a SIP INVITE message that (i) includes either no BSSID at all or a BSSID for which the access point database does not have a corresponding location and (ii) lacks any other usable indicator of the mobile node's location. For such cases, the SIP proxy server may route the call to a default answering point. For example, the SIP proxy server may route the call to a special operator who can speak to the caller and then determine the appropriate PSAP for the call.

CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for emergency services call routing in a network that includes a voice-over-packet (VoP) network and a plurality of public safety answering points (PSAPs), said method comprising:

a mobile node obtaining a first indicator of its location by a first method;

said mobile node obtaining a second indicator of its location by a second method, wherein said first and second methods are distinct;

a wireless access point of said VoP network receiving from said mobile node at least one message relating to an emergency services call originating from said mobile node, wherein said at least one message includes a Session Initiation Protocol (SIP) INVITE message that requests establishment of said emergency services call and includes said first and second indicators; and routing said call to a particular PSAP, from among said plurality of PSAPs, based on at least one of said first and second indicators.

2. The method of claim 1, wherein said first indicator is an identifier of said wireless access point.

3. The method of claim 2, wherein said identifier is a basic service set identifier (BSSID).

4. The method of claim 3, wherein said BSSID is a wireless medium access control (MAC) address.

5. The method of claim 2, wherein said first method comprises:

said mobile node associating with said wireless access point.

6. The method of claim 1, wherein said second indicator is a latitude/longitude position.

7. The method of claim 1, wherein said second method comprises:

said mobile node determining its position using a wireless positioning technology.

8. The method of claim 7, wherein said wireless positioning technology involves a satellite-based positioning system.

9. The method of claim 7, wherein said wireless positioning technology involves tower triangulation.

10. The method of claim 1, wherein said emergency services call is a 9-1-1 call.

11. A method for emergency services call origination, said method comprising:

a mobile node associating with a wireless access point of a voice-over-packet (VoP) network;

said mobile node storing a basic service set identifier (BSSID) of said wireless access point;

said mobile node receiving a request from a user to originate an emergency services call; and in response to said request, said mobile node:

(a) determining a mobile node position using a wireless positioning technology; and (b) wirelessly transmitting a Session Initiation Protocol (SIP) INVITE message to said wireless access point, said SIP INVITE message including said BSSID and said mobile node position.

12. The method of claim 11, wherein said SIP INVITE message includes a mobile directory number (MDN) of said mobile node.

13. The method of claim 11, further comprising:

a SIP proxy server receiving said SIP INVITE message and responsively looking up said BSSID in a database.

14. The method of claim 13, further comprising:

said SIP proxy server determining that said database has a wireless access point location corresponding to said BSSID; and said SIP proxy server routing said SIP INVITE message based on said wireless access point location.

15. The method of claim 13, further comprising:

said SIP proxy server determining that said database does not have a wireless access point location corresponding to said BSSID; and said SIP proxy server routing said SIP INVITE message based on said mobile node position.

16. The method of claim 11, further comprising:

said mobile node obtaining said BSSID as a result of associating with said wireless access point.

17. A system for emergency services call routing in a network that includes a voice-over-packet (VoP) network and a plurality of public safety answering points (PSAPs), said system comprising:

a plurality of wireless access points communicatively coupled to said VoP network, each of said wireless access points being associated with a respective basic service set identifier (BSSID);

an access point database, said access point database storing BSSIDs and locations of said wireless access points;

an automatic location information (ALI) database, said ALI database storing information regarding areas served by each of said PSAPs; and a proxy server communicatively coupled to said VoP network, access point database, and said ALI database, wherein said proxy server consults said access point database and said ALI database to selectively route an emergency services call from one of said wireless access points to an appropriate one of said PSAPs.

18. The system of claim 17, wherein said ALI database stores routing addresses for routing emergency services calls to said PSAPs.

* * * * *